United States Patent [19]

Webster

[11] Patent Number: 5,004,059
[45] Date of Patent: Apr. 2, 1991

[54] STRESS WAVE LOAD CELL
[75] Inventor: John R. Webster, Derby, England
[73] Assignee: Rolls-Royce plc, London, England
[21] Appl. No.: 480,661
[22] Filed: Feb. 15, 1990
[30] Foreign Application Priority Data
Mar. 14, 1989 [GB] United Kingdom ............... 8905821
[51] Int. Cl.⁵ ........................ G01G 3/14; G01L 1/10
[52] U.S. Cl. .......................... 177/210 R; 73/862.59
[58] Field of Search ................ 177/210 R; 73/862.59
[56] References Cited
U.S. PATENT DOCUMENTS

| | | | |
|---|---|---|---|
| 3,812,345 | 5/1974 | Stone | 177/210 R |
| 3,855,847 | 12/1974 | Leschek | 73/71.4 |
| 3,915,017 | 10/1975 | Robinson | 177/212 X |
| 4,317,368 | 3/1982 | McElroy | 73/587 |
| 4,701,866 | 10/1987 | Harrison et al. | 177/163 X |
| 4,782,701 | 11/1988 | Proctor, Jr. | 73/587 |

Primary Examiner—George H. Miller, Jr.
Attorney, Agent, or Firm—Cushman, Darby & Cushman

[57] ABSTRACT

A stress wave load cell comprises a propagation member to which is acoustically coupled a transmitting transducer and a receiving transducer. Electrical pulses are supplied to the transducer form a pulse generator and the electrical pulses are converted into stress wave signals which propagate through the propagation member. The transducer detects the stress wave after propagation through the propagation member and supplies an electrical signal to a processor which gives a measure fo the load applied on the load cell.

Damping members apply a damping load on the propagation member when a load is applied to the load cell. The damping members damp the propagation of the stress waves in the propagation member and the decay rate of the diffuse stress wave field set up in the propagation member is dependent upon the load applied on the load cell.

10 Claims, 2 Drawing Sheets

LOAD CELL MEASUREMENTS

STRESS WAVE LOAD CELL

The present invention relates to load cells and in particular to load cells which are responsive to structure borne stress waves.

Common forms of load cell use strain to cause a change of electrical resistance or to generate electrical signals by the piezo-electric effect. Such devices are susceptible to electromagnetic interference, and are affected to various degrees by high temperatures and vibrations.

The present invention seeks to provide a novel stress wave load cell.

Accordingly the present invention provides a stress wave load cell comprising a propagation member which allows the propagation of stress waves therethrough, at least one transducer acoustically coupled to the propagation member, at least one damping member arranged such that when a load is applied to the load cell a damping load is applied on at least one surface of the propagation member by the damping member, the damping load applied by the damping member increases with the load, the at least one transducer being arranged to launch a stress wave signal into the propagation member and at least one means to detect the stress wave signal after it has propagated through the propagation member and been damped by any damping load applied by the damping member on the propagation member, the at least one means to detect the stress wave signal being arranged to convert any detected stress waves into an electrical signal, a processor being arranged to process the electrical signal to give an electrical output signal as a measure of the load applied on the load cell.

A single transducer may launch the stress wave signal into the propagation member and the transducer is the at least one means to detect the stress wave signal after it has propagated through the propagation member.

A first transducer may launch the stress wave signal into the propagation member and a second transducer is the at least one means to detect the stress wave signal after it has propagated through the propagation member.

The propagation member may be formed from metal, glass or ceramic.

The propagation member may have a first surface, a second surface parallel to the first surface, a first damping member arranged to apply a damping load on the first surface and a second damping member arranged to apply a damping load on the second surface.

The damping member may be formed from rubber.

The at least one transducer may be acoustically coupled to the propagation member by a waveguide.

The electrical output signal may operate a switch when a predetermined load is detected.

The electrical output signal may operate an alarm when a predetermined load is detected.

Load transmission members may act on the first and second damping members such as to cause the first and second damping members to apply a damping load on the propagation member.

The present invention will be more fully described by way of example with reference to the accompanying drawings, in which.

Figure 1:
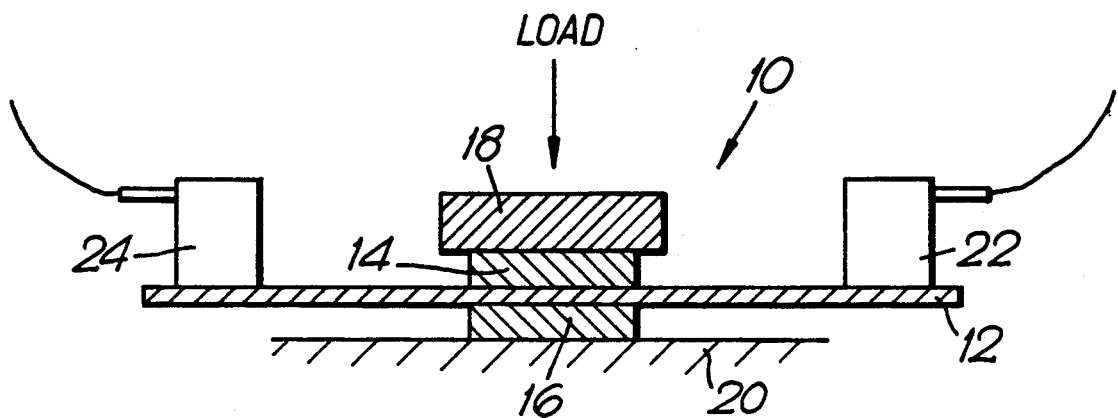
FIG. 1 is a cross-sectional view of a stress wave load cell according to the present invention.

A stress wave load cell 10 according to the present invention is shown in FIG. 1. The stress wave load cell 10 comprises a propagation member 12, which may be a sheet or bar or other suitable member, formed from a material which allows the propagation of stress waves therethrough. The propagation member conducts stress waves and may for example be formed from metal, glass or ceramic. A first damping member 14 and a second damping member 16 are arranged in close proximity to opposite surfaces of the propagation member 12. The damping members 14 and 16 are resilient and are formed from a rubber. A first load transmission member 18 and a second load transmission member 20 are arranged to act on the first and second damping members 14 and 16 such that the damping members 14 and 16 move into damping contact, and/or apply a greater damping effect on the propagation member 12 when a load is applied to the load cell 10. First and second acoustic emission type transducer 22 and 24 are acoustically coupled to the propagation member 12. The first transducer 22 is a transmitter and is electrically connected to a pulse generator (not shown). The second transducer 24 is a receiver and is electrically connected to a signal processor (not shown). The signal processor may be connected to either a recorder or a display, or to both if desired.

In operation of the stress wave load cell 10 the application of a compressive load onto the load transmission members 18 and 20 causes the first and second damping member 14 and 16 to move into damping contact with the propagation member 12, (if the damping members are not already in contact with the propagation member 12) and as the load applied to the load cell increases the damping applied by the damping members 14 and 16 upon the propagation member 12 increases. The pulse generator (not shown) sends electrical pulses to the first transducer 22, which converts the electrical pulses into stress waves which are launched into the propagation member 12. The second transducer 24 detects the stress waves after they have propagated through the propagation member 12 and converts the stress waves into electrical signals. The electrical signals corresponding to the stress waves detected are processed by the processor to give an electrical output signal which is a measure of the load applied on the load cell 10. The decay rate of a reverberative or diffuse, stress wave field set up in the propagation member is dependent upon the load applied on the load cell 10. Thus the processor may be arranged to measure the decay rate of the reverberative stress wave field, and this measure is indicative of the amount of damping applied by the damping members 14 and 16 and hence the load applied on the load cell 10.

Figure 5:
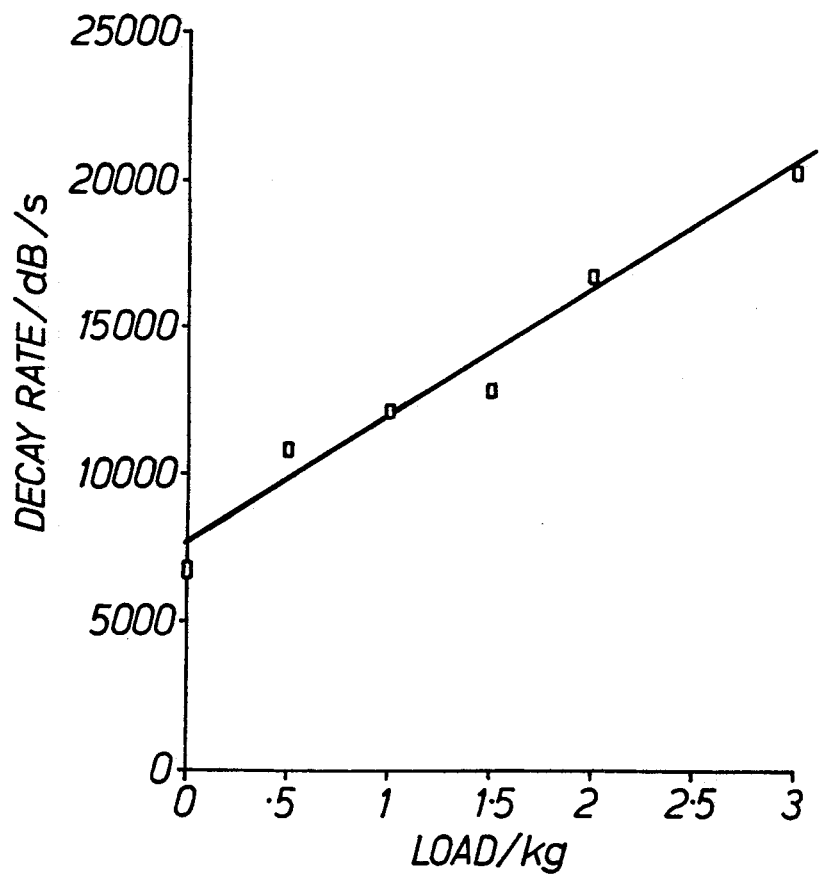
FIG. 5 is a graph of decay rate of the stress waves against load.

FIG. 5 shows a graph of stress wave decay rate against the load applied on the load cell, and a straight line is achieved which indicates that the relationship between applied load and stress wave decay rate is linear.

In the example above, stress waves with a frequency content in the region of 150 KHz were used, although other suitable frequencies of stress waves may be used. The transducers used were resonant piezoelectric transducers.

Figure 2:
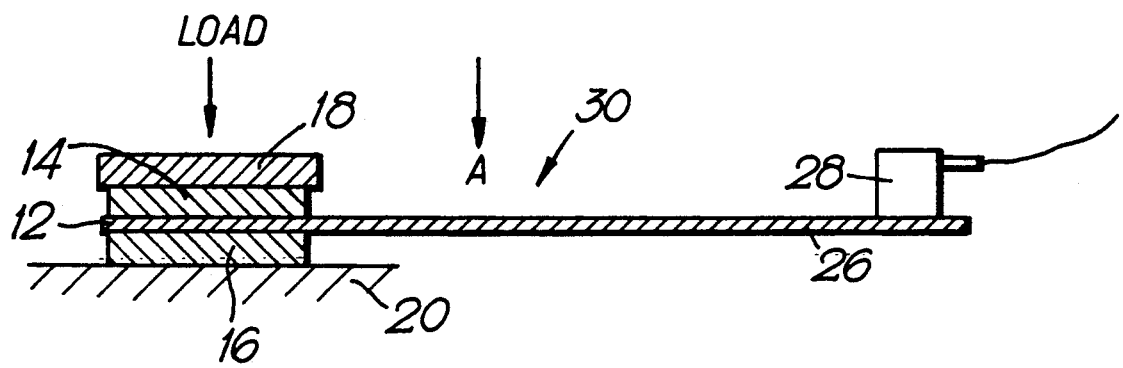
FIG. 2 is a cross-sectional view of a second embodiment of a stress wave load cell according to the present invention.
Figure 3:
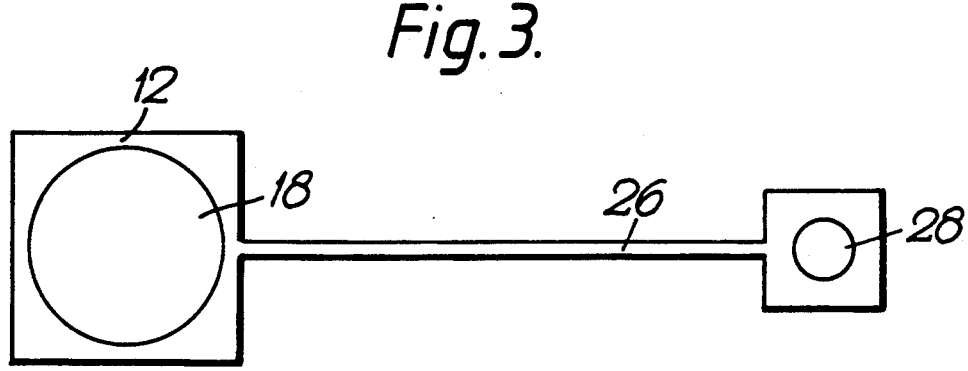
FIG. 3 is a view in the direction of arrow A in FIG. 2.

In FIGS. 2 and 3 a stress wave load cell 30 is shown which is substantially the same as the embodiment in FIG. 1, and operates in a similar manner, but differs in that a waveguide 26 is acoustically coupled between the propagation member 12 and a single transducer 28. The transducer 28 acts both as a transmitter and as a receiver, and is electrically connected to pulse generator, a processor, a recorder and display.

The embodiment in FIGS. 2 and 3 allows the load to be measured at one location, while the transducer is located at a remote position and is acoustically coupled to the propagation member by a waveguide of suitable length. The waveguide is formed form a material which also allows stress waves to propagate therethrough.

Figure 4:
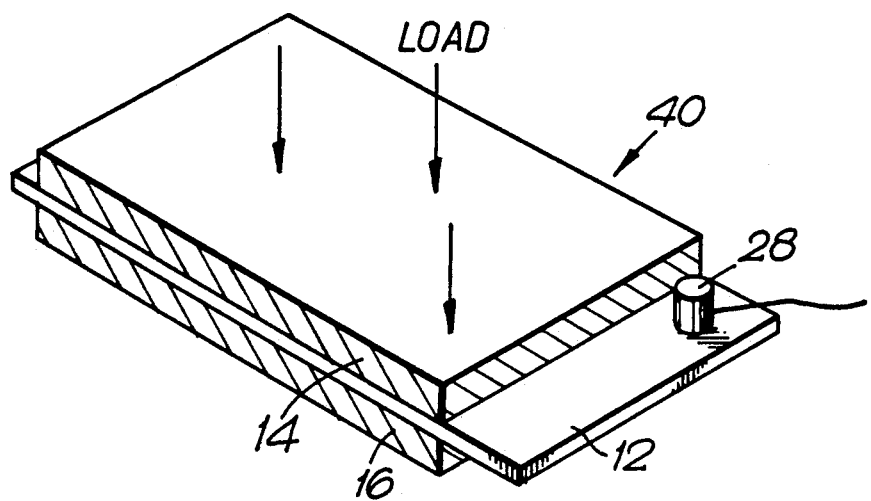
FIG. 4 is a perspective view of a third embodiment of a stress wave load cell according to the present invention.

The stress wave load cell 40 in FIG. 4 is substantially the same as the embodiment in FIG. 1, and operates in a similar manner, but does not have the load transmission members. This arrangement allows a single object, or a plurality of objects to be placed on the damping member 14 at a plurality of locations and the load cell 40 measures the load applied by each of the objects and gives an integrated measure of the load applied on the load cell.

The present invention allows a load cell to be produced which is less susceptible to electrical interference, and the embodiment in FIGS. 2 and 3 may be used in corrosive, high temperature or other hostile environments by using the remote transducer. The stress wave load cell is an active system and failures may be easily detected.

The stress wave load cell may be used as a touch sensitive switch, an intruder detector or a device to detect removal of an object all of which detect changes in load. In the use of the stress wave load cell as an intruder detector, the stress wave load cell may be positioned under a carpet.

I claim:

1. A stress wave load cell comprising a propagation member which allows the propagation of stress waves therethrough, the propagation member having at least one surface, at least one damping member arranged such that when a load is applied to the load cell a damping load is applied on the at least one surface of the propagation member by the damping member, the damping load applied by the damping member increasing with the load, at least one transducer acoustically coupled to the propagation member, the at least one transducer being arranged to launch a stress wave signal into the propagation member, at least one means acoustically coupled to the propagation member to detect the stress wave signal after it has propagated through the propagation member and been damped by any damping load applied by the damping member on the propagation member, the at least one means to detect the stress wave signal being arranged to convert any detected stress waves into an electrical signal, a processor being arranged to process the electrical signal to give an electrical output signal as a measure of the load applied on the load cell.

2. A stress wave load cell as claimed in claim 1 in which a single transducer launches the stress wave signal into the propagation member and the transducer is the at least one means to detect the stress wave signal after it has propagated through the propagation member.

3. A stress wave load cell as claimed in claim 1 in which a first transducer launches the stress wave signal into the propagation member and a second transducer is the at least one means to detect the stress wave signal after it has propagated through the propagation member.

4. A stress wave load cell as claimed in claim 1 in which the propagation member is formed from metal, glass or ceramic.

5. A stress wave load cell as claimed in claim 1 in which the propagation member has a first surface and a second surface parallel to the first surface, a first damping member is arranged to apply a damping load on the first surface and a second damping member is arranged to apply a damping load on the second surface.

6. A stress wave load cell as claimed in claim 1 in which the damping member is formed from rubber.

7. A stress wave load cell as claimed in claim 1 in which the at least one transducer is acoustically coupled to the propagation member by a waveguide.

8. A stress wave load cell as claimed in claim 1 in which the electrical output signal operates a switch when a predetermined load is detected.

9. A stress wave load cell as claimed in claim 1 in which the electrical output signal operates an alarm when a predetermined load is detected.

10. A stress wave load cell as claimed in claim 5 in which load transmission members act on the first and second damping members such as to cause the first and second damping members to apply a damping load on the propagation member.

* * * * *